United States Patent
Hirahara et al.

(10) Patent No.: US 7,579,951 B2
(45) Date of Patent: Aug. 25, 2009

(54) TRACKING RADIO FREQUENCY IDENTIFICATION TAGS

(75) Inventors: Edwin Hirahara, Federal Way, WA (US); David L. Lee, Tacoma, WA (US)

(73) Assignee: Organicid, Inc, Colorado Springs, CO (US)

(*) Notice: Subject to any disclaimer, the term of this patent is extended or adjusted under 35 U.S.C. 154(b) by 88 days.

(21) Appl. No.: 11/321,002

(22) Filed: Dec. 28, 2005

(65) Prior Publication Data

US 2007/0152823 A1 Jul. 5, 2007

(51) Int. Cl.
*G08B 13/14* (2006.01)

(52) U.S. Cl. ............... 340/572.1; 340/571; 340/572.2; 340/572.4; 340/572.8; 340/539.13

(58) Field of Classification Search ............ 340/539.1, 340/539.13, 571, 572.1
See application file for complete search history.

(56) References Cited

U.S. PATENT DOCUMENTS

| | | | |
|---|---|---|---|
| 5,214,409 A * | 5/1993 | Beigel .................. 340/572.1 |
| 5,604,485 A * | 2/1997 | Lauro et al. ............ 340/572.5 |
| 5,804,810 A * | 9/1998 | Woolley et al. ........... 235/492 |
| 5,973,598 A | 10/1999 | Beigel |
| 6,259,369 B1 | 7/2001 | Monico |
| 6,278,413 B1 | 8/2001 | Hugh et al. |
| 6,340,932 B1 | 1/2002 | Rodgers et al. |
| 6,427,913 B1 * | 8/2002 | Maloney .................. 235/383 |
| 6,509,217 B1 | 1/2003 | Reddy |
| 6,655,299 B2 | 12/2003 | Preisler et al. |
| 6,667,092 B1 | 12/2003 | Brollier et al. |
| 6,726,099 B2 * | 4/2004 | Becker et al. ............. 235/380 |
| 6,731,198 B1 * | 5/2004 | Stobbe et al. ........... 340/10.33 |
| 6,838,989 B1 | 1/2005 | Mays et al. |
| 6,940,467 B2 * | 9/2005 | Fischer et al. .............. 343/850 |
| 6,943,678 B2 | 9/2005 | Muirhead |
| 6,961,000 B2 * | 11/2005 | Chung ................... 340/572.1 |
| 7,088,229 B2 * | 8/2006 | Johnson .................... 340/505 |
| 7,342,496 B2 | 3/2008 | Muirhead |
| 2001/0054755 A1 | 12/2001 | Kirkham |
| 2002/0021208 A1 | 2/2002 | Nicholson et al. |
| 2004/0070504 A1 | 4/2004 | Brollier et al. |
| 2004/0164864 A1 | 8/2004 | Chung et al. |
| 2005/0043854 A1 | 2/2005 | Dunlap, Jr. |

(Continued)

OTHER PUBLICATIONS

*Draft Implementation Guideline V0.2 —Distribution limited to Pack SIG Members*, © 2004 MIT Auto-ID Labs.

(Continued)

*Primary Examiner*—Daniel Wu
*Assistant Examiner*—Son M Tang
(74) *Attorney, Agent, or Firm*—Christensen O'Connor Johnson Kindness PLLC

(57) ABSTRACT

A container assembly for tracking a radio frequency identification tag (20) generally includes at least one container (22), an RFID tag (24) associated with the container, and an RFID signal transmitter (26) associated with the radio frequency identification tag. The RFID signal transmitter is capable of transmitting an RFID response signal (1044). The assembly further includes a tracking signal transmitter (28) associated with the RFID signal transmitter. The tracking signal transmitter is capable of transmitting a tracking signal (1046), and the tracking signal is different at least in part from the RFID signal.

13 Claims, 6 Drawing Sheets

U.S. PATENT DOCUMENTS

| | | | |
|---|---|---|---|
| 2005/0052283 A1 | 3/2005 | Collins et al. | |
| 2005/0093677 A1 | 5/2005 | Forster et al. | |
| 2005/0093678 A1 | 5/2005 | Forster et al. | |
| 2005/0093701 A1 | 5/2005 | Hollon | |
| 2005/0151651 A1 | 7/2005 | Tan | |
| 2005/0162331 A1 | 7/2005 | Endo et al. | |
| 2005/0263592 A1* | 12/2005 | Berger et al. | 235/385 |
| 2006/0114102 A1* | 6/2006 | Chang et al. | 340/10.1 |
| 2006/0123463 A1* | 6/2006 | Yeap et al. | 726/2 |
| 2006/0273902 A1* | 12/2006 | Shafer et al. | 340/572.1 |
| 2007/0024423 A1* | 2/2007 | Nikitin et al. | 340/10.1 |
| 2008/0122610 A1 | 5/2008 | Muirhead | |

OTHER PUBLICATIONS

"How the Parallel-LC Circuit Stores Energy," tpub.com, n.d., <http://www.tpub.com/neets/book9/34d.htm> [retrieved Aug. 23, 2005].

"MSN Encarta-Radio," encarta.msn.com, © 2005 Microsoft, http://encarta.msn.com/encyclopedia_761569907_2/Radio.html[retrieved Aug. 19, 2005].

"RF Micro • Devices AN0003: A Quick Guide to Tank Circuits,"*Technical Notes and Articles*, © 1997-2002 RF Micro Devices, Inc., 4-page brochure.

Wireless FM Transmitter, boondog.com, n.d., <http://www.boondog.com/tutorials/rfTransmitter/rfTransmitter.htm> [retrieved Aug. 19, 2005].

* cited by examiner

TRACKING RADIO FREQUENCY IDENTIFICATION TAGS

TECHNICAL FIELD

Embodiments of the present disclosure relate generally to radio frequency identification (RFID) tag performance and to systems and methods for tracking radio frequency identification tags.

BACKGROUND

Radio frequency identification (RFID) tags are tags with small integrated circuits which may be attached to containers, packages, or individual goods. They are used to store information about the item such as price, serial number, and shipping information (including tracking number, shipping date, arrival date, as well as other information). RFID tags generally include an RFID signal transmitter which generates an RFID signal. In general, the RFID signal transmitter detects a reader interrogation signal and replies by transmitting a response signal that contains the information stored in the RFID transmitter. The reader detects the response signal from the RFID signal transmitter and stores the information in its memory. Some RFID tags contain a battery, while others store the energy of received interrogation signals and use that energy to power their circuits.

Environmental, material, and electromagnetic conditions may affect the performance of RFID tags and RFID signal transmitters. Different physical mechanisms that affect the propagation of electromagnetic or radio waves include reflection or scattering, absorption, spreading loss, and interference. In a space free of any obstructions or absorption mechanisms, the strength of an RFID signal declines in inverse proportion to the square of the distance. For an electromagnetic wave propagating through a region in which reflections can arise from the ground and from obstacles (particularly metal or liquid obstacles), the reduction in strength is greater and can vary considerably. The disruptive materials may be the goods within their packaging, the surface of the goods themselves, or the walls of the exterior container. Additionally, environmental conditions, especially "noise" from other systems (including mechanical and electrical noise), may also interfere with signal reception or signal recognition. Moreover, the RFID tag may be absent (i.e., missing or stolen) or present but not operable.

For these reasons mentioned above, as well as other reasons, a reader interrogation signal is often not received or recognized by the RFID signal transmitter. And, similarly, the response signal from the RFID signal transmitter is often not received or recognized by the reader. This means that the contents of the container, the composition of the container, and the interrogation environment can influence whether 100% tag readability can be achieved in practice. Although currently available tags are effective at transmitting information, they fail to provide a mechanism for tracking signal transmissions to allow system operators to re-scan, re-position, or otherwise manually recognize and record product information that was previously not recognized by the RFID system.

SUMMARY

This Summary is provided to introduce a selection of concepts in a simplified form that are further described below in the Detailed Description. This Summary is not intended to identify key features or essential features of the claimed subject matter. Nor is it intended to be used to limit the scope of the claimed subject matter.

In accordance with one embodiment of the present disclosure, a container assembly for tracking a radio frequency identification tag is provided. The assembly includes a container having a container body. A first radio frequency identification tag is associated with the container body. A first radio frequency signal transmitter is associated with the first radio frequency identification tag, wherein the first radio frequency signal transmitter is capable of transmitting a first radio frequency signal. A second radio frequency signal transmitter is associated with the first radio frequency signal transmitter, wherein the second radio frequency signal transmitter is capable of transmitting a second radio frequency signal different at least in part from the first radio frequency signal.

In accordance with another embodiment of the present disclosure, a method of tracking a radio frequency identification tag is provided. The method includes obtaining a container having a container body and associating a first radio frequency identification tag with the container body. The method further includes associating a first radio frequency signal transmitter with the first radio frequency identification tag, wherein the first radio frequency signal transmitter is capable of transmitting a first radio frequency signal. The method further includes associating a second radio frequency signal transmitter with the first radio frequency signal transmitter, wherein the second radio frequency signal transmitter is capable of transmitting a second radio frequency signal different at least in part from the first radio frequency signal.

In accordance with still other embodiments of the present disclosure, a method of determining the accuracy of the readability of a first radio frequency signal by a radio frequency reader is provided. In a container apparatus of the type having at least one radio frequency signal transmitter that transmits a first radio frequency signal associated with the container and a second radio frequency signal associated with the container and a radio frequency reader that transmits a radio frequency interrogation signal, the method includes receiving the interrogation signal transmitted from the reader at the at least one radio frequency signal transmitter. The method further includes transmitting the second radio frequency signal at the at least one radio frequency signal transmitter.

BRIEF DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION OF THE EXEMPLARY EMBODIMENTS

Figure 1:
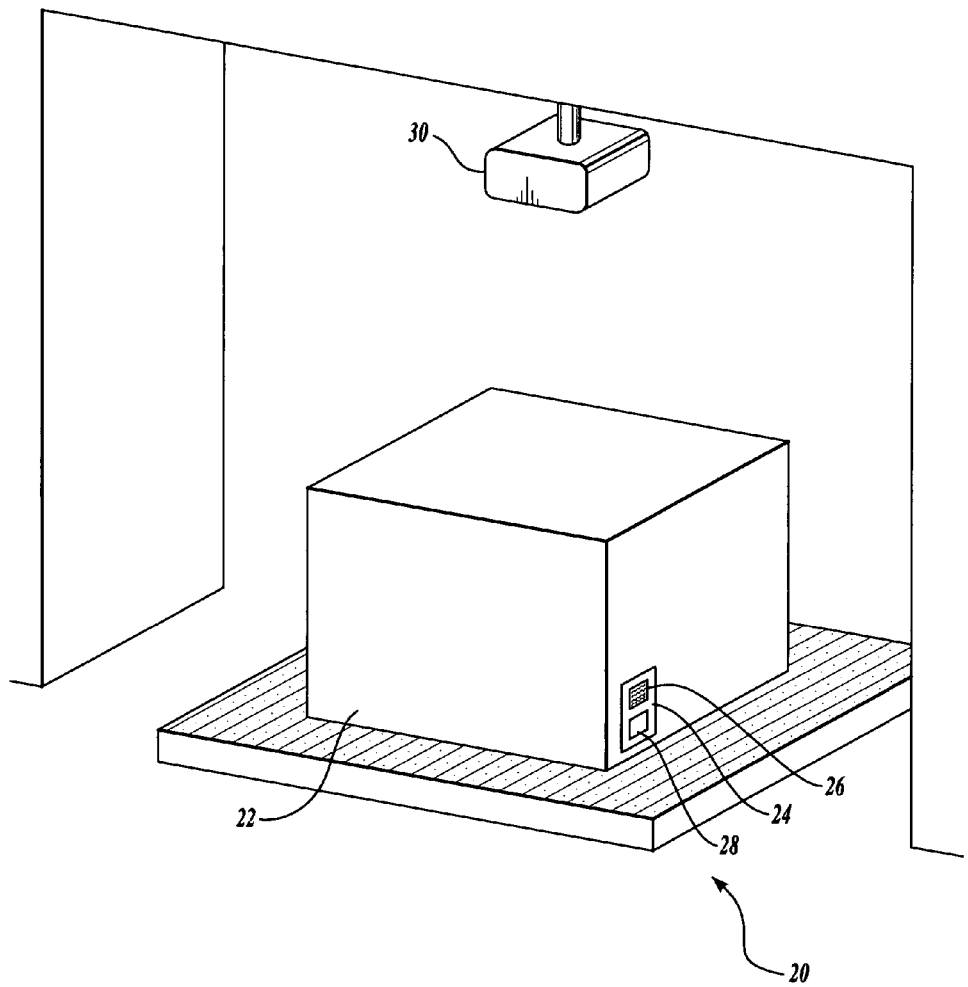
FIG. 1 is a perspective view of an exemplary embodiment of a container assembly formed according to various aspects of the present disclosure.

Embodiments of the present disclosure are generally directed to a container assembly for tracking a radio frequency identification tag and methods of tracking radio frequency identification tags. A container assembly for tracking a radio frequency identification tag 20 constructed in accordance with one embodiment of the present disclosure may be best understood by referring to FIG. 1. The assembly 20 generally includes at least one container 22, a radio frequency identification tag 24 (hereinafter "RFID tag 24") associated with the container 22, and a first radio frequency identification signal transmitter 26 (hereinafter "RFID signal transmitter 26") associated with the radio frequency identification tag 24. The RFID signal transmitter 26 is capable of transmitting a first radio frequency identification response signal 1044 (FIG. 2) (hereinafter "RFID response signal 1044").

Figure 2:
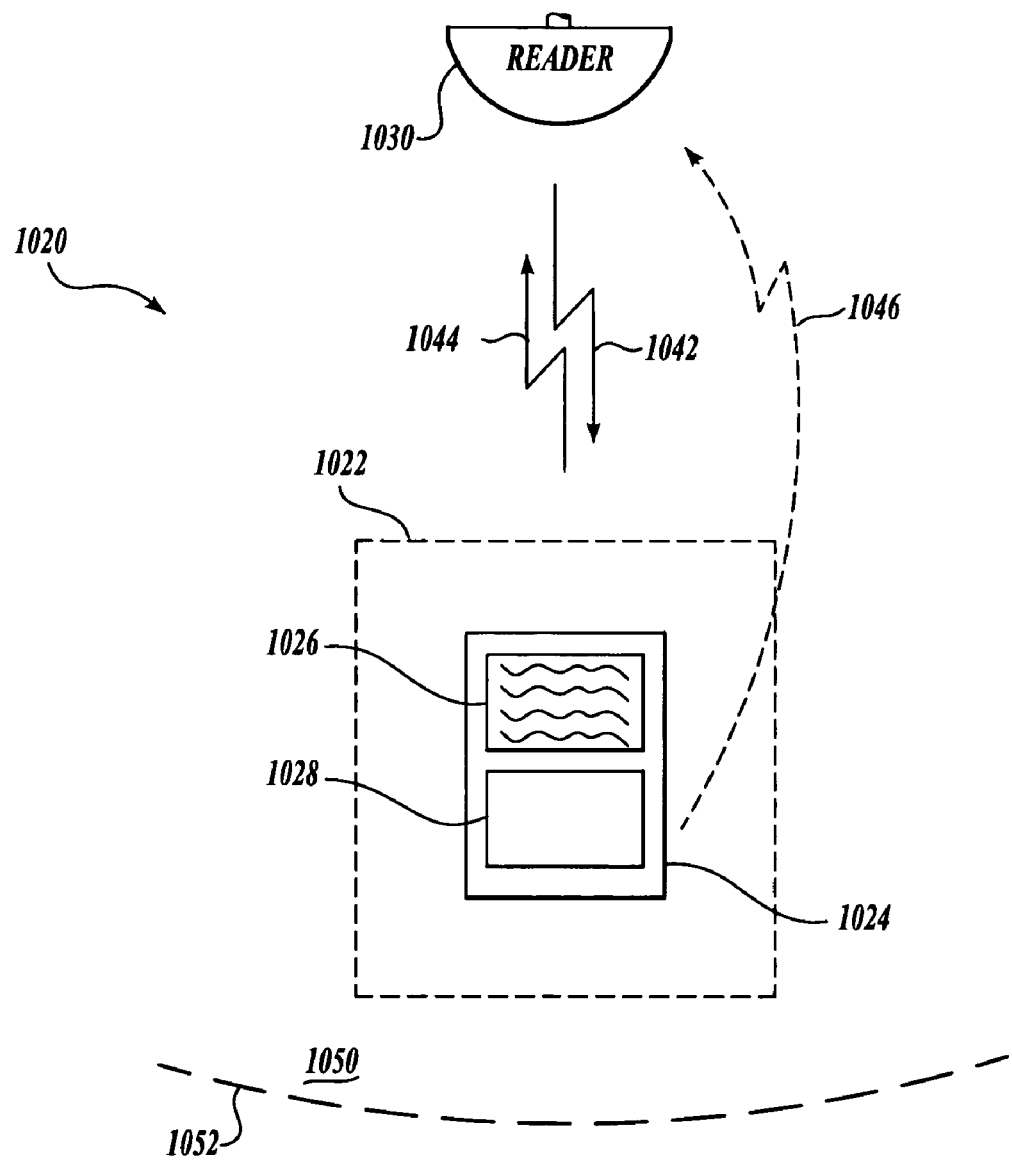
FIG. 2 is a functional block diagram of a container assembly according to the embodiment of FIG. 1.

The assembly 20 further includes a second radio frequency signal transmitter 28 (or a "tracking signal transmitter 28") associated with the RFID signal transmitter 26. The tracking signal transmitter 28 is capable of transmitting a second radio frequency signal 1046 (FIG. 2) (or a "tracking signal 1046"). The tracking signal transmitter 28 is configured to track the operation of the RFID signal transmitter 26, including the existence or interrogation of the RFID signal transmitter 26 and/or the readability of the RFID response signal 1044 (FIG. 2) by a radio frequency receiver or reader 30. As described in greater detail below, the tracking signal 1046 (FIG. 2) is different at least in part from the RFID response signal 1044 (FIG. 2).

The container 22 may include a body of substantially electrically non-conductive material, such as paper, cardboard, paperboard, corrugated paperboard, or like cellulosic materials. For example, the container 22 is a substantially cubic box manufactured primarily from corrugated paperboard. The container 22 comprises multiple walls having a first linerboard and a second linerboard with a corrugated filler between the first and second linerboards, as generally known and used in the art. The thickness of the container walls depends upon the thickness of the linerboards, as well as the thickness of the corrugated filler therebetween.

Although the container 22 in the illustrated embodiment is manufactured from corrugated paperboard, it should be appreciated that other containers made from other materials are also within the scope of the described embodiments. As non-limiting examples, the container may be formed from metals (such as foils), wood, plastics (such as shrink wrap or pouch-packets), glass, or any other materials or combinations thereof.

Returning to FIG. 1, the RFID tag 24 is generally a flat label or tag, which includes an RFID signal transmitter 26. The RFID tag 24 is attached or adhered to, or otherwise associated with the container body 22. The RFID signal transmitter 26 is generally manufactured using integrated circuit technology, programmed with a unique identifier and assembled with either a printed circuit antenna, a printed conductive ink antenna, or an antenna fabricated from small wires. As a non-limiting example, the RFID signal transmitter 26 may be configured as a flat assembly for incorporation into the RFID tag 24. The RFID signal transmitter 26 may be categorized as either active or passive, both of which may be practiced with embodiments of the present disclosure.

Active RFID signal transmitters are powered by an internal battery and are typically read/write, which means that tag data can be read by the reader as well as rewritten and/or modified by the reader. In a typical read/write RFID system, an RFID signal transmitter contains identification and content data in the form of encoded data. The RFID signal transmitter can also receive information from a reader in the form of encoded data. This encoded data then becomes part of the history of the tagged container. The battery-supplied power of an active RFID signal transmitter generally gives it a greater radio frequency receiving and outputting range when compared to passive RFID signal transmitters.

Passive RFID signal transmitters operate without a separate external power source and are configured to obtain their operating power from a secondary source, such as the reader 30.

Whether the RFID signal transmitter 26 is active or passive, the RFID signal transmitter 26 is capable of receiving a radio frequency interrogation signal from the reader 30 and, based on the received interrogation signal, is capable of generating and transmitting an RFID response signal carrying content and identification data. Because RFID tags that are capable of receiving interrogation signals and outputting content or identification data as response signals are well known in the art, a further description of RFID tags will not be contained herein. However, it should be appreciated that any conventional or future-developed RFID tags that are capable of receiving interrogation signals and outputting content or identification data as response signals, including the inductance and capacitance type, may be practiced with embodiments of the present disclosure.

As discussed above, the RFID signal transmitter 26 is read by a radio frequency reader 30. The reader 30 is a well-known RFID tag reader and thus will not be described in any more detail. The reader 30 shown in FIG. 1 is a fixed reader. Although the illustrated reader 30 is a fixed reader, it should be appreciated, however, that enhancing the readability of RFID tags by employing non-fixed readers (such as a hand-held reader device) is also contemplated and therefore within the scope of the present disclosure. In use, the reader 30 transmits radio frequency interrogation signals at ranges of anywhere from 1 inch to 100 feet or more, depending on the reader power output and the radio frequency employed. The area of transmission of the reader signals defines a reader communication field.

When the RFID tag 24 passes through or is located within the reader communication field, the RFID signal transmitter 26 detects a reader interrogation signal and responds by transmitting a modulated RFID response signal carrying content or identification data associated therewith. The content and identification data carried by the RFID response signal typically corresponds to the container 22 that is associated with the RFID tag 24 and includes information such as destination, model and serial numbers, customer numbers, instructions for handling, etc. The reader 30, by its associated antenna, detects the RFID response signal transmitted by the RFID signal transmitter 26, and demodulates and decodes the RFID response signal to obtain the associated content or identification data, as known in the art. The content or identification data may then be passed to a host computer for processing, as known in the art.

Sometimes the RFID signal transmitter 26 does not receive the interrogation signal or the reader 30 does not receive the RFID response signal due to a variety of reasons. As non-limiting examples, (a) the interrogation signal is too weak to carry from the reader 30 to the RFID tag 24; (b) the interrogation signal is too weak to cause the RFID signal transmitter 26 to generate and transmit its identity and content data; (c) the RFID response signal is too weak to carry from the RFID signal transmitter 26 back to the reader 30; (d) the RFID tag 24 is absent (i.e., lost or stolen); and (e) the RFID tag 24 is present, but the RFID signal transmitter 26 is inoperable. Thus, accurate and reliable detection of RFID tags is an ongoing problem in conventional RFID systems.

To track and/or identify RFID tag 24 and/or RFID signal transmitter 26 problems (such as those listed as (a)-(e) above), the assembly 20 may include a second radio frequency signal transmitter 28 (or a tracking signal transmitter 28) associated with the RFID signal transmitter, which is capable of transmitting a second radio frequency signal (or a tracking signal), as best shown in FIG. 1. For example, if the RFID signal transmitter 26 cannot transmit an RFID response signal carrying content and identification data with enough strength, or if the RFID response signal is interrupted (for example, by environmental noise, signal reflection, scattering, absorption, or spreading loss), the RFID response signal will not reach the reader 30 or will not be understood by the reader 30. The tracking signal transmitter 28 therefore can expose RFID tag 24 and/or RFID signal transmitter 26 problems by transmitting a tracking signal (i.e., a second signal) that is different at least in part from the RFID response signal and therefore is more apt to be read by the reader 30 than the RFID response signal.

The tracking signal transmitter 28, like the RFID signal transmitter 26, may be any conventional radio frequency identification signal transmitter capable of, for example, receiving an interrogation signal from a reader and transmitting a response signal carrying a desired quantity of data at an appropriate retransmission strength. The tracking signal transmitter 28 is generally manufactured using integrated circuit technology, programmed with a unique identifier, and assembled with either a printed circuit antenna, a printed conductive ink antenna, or an antenna fabricated from small wires.

In the illustrated embodiment of FIG. 1, the tracking signal transmitter 28 is a flat assembly circuit, discrete from the RFID signal transmitter 26 (both of which may be incorporated within the same RFID tag 24) for the transmission of two discrete signals, such as an RFID response signal and a tracking signal. Like the RFID signal, the tracking signal data also corresponds to the container 22 that is associated with the RFID tag 24. However, the tracking signal is different from the RFID response signal (for example, in the quantity of data transmitted by the signal), such that it is more apt to be received by the reader 30.

Still referring to FIG. 1, if the reader 30 receives a tracking signal from a tracking signal transmitter 28 but does not identify an RFID signal from an RFID signal transmitter 26 associated with the tracking signal transmitter 28, then a "problem" within the assembly 20 can be identified. In effect, receipt by the reader 30 of the tracking signal without an associated RFID signal establishes the existence of a faulty RFID signal transmitter 26 in need of repositioning, repair, or replacement or a failed RFID signal transmission in need of retransmission or an extended period of transmission time such that it can be received by the reader 30. No receipt by the reader 30 of either a tracking signal or an RFID signal may establish the existence of both a faulty RFID signal transmitter 26 and a faulty tracking signal transmitter 28 (for example, an RFID tag 24 that was submerged in water and both circuits shorted out), or in some cases, an absent RFID tag 24, or even an absent container 22.

In the illustrated embodiment of FIG. 1, one tracking signal transmitter 28 is associated with each RFID signal transmitter 26. However, it should be understood that in other embodiments of the present disclosure, one or more tracking signal transmitters may be added to the container assembly for tracking RFID tags.

As noted above, the tracking signal transmitter 28 is different at least in part from the RFID signal transmitter 26. The tracking signal transmitter 28 may differ in that it includes less data in its memory than the RFID signal transmitter 26. As a non-limiting example, the tracking signal transmitter 28 transmits a one-bit response signal carrying present/absent data to indicate the presence of the tracking signal transmitter 28 itself. In this example, no signal from a tracking signal transmitter 28 indicates the absence of the tracking signal transmitter 28. Because the tracking signal in this example has less data relative to the RFID signal, the time for the reader 30 to receive and detect the tracking signal is reduced, therefore making the tracking signal less prone to interference from environmental noise and, thus, more apt to be received by the reader 30, as compared to the RFID signal.

Although in some embodiments the tracking signal transmitter 28 may be a lower memory radio frequency transmitter than the RFID signal transmitter 26, tracking signal transmitters operate similarly to and may be referred to as RFID signal transmitters. For example, like the RFID signal transmitter 26, the tracking signal transmitter 28 may be either a passive or an active transmitter, as described above. In other embodiments, the tracking signal transmitter 28 may include more data than merely whether the RFID tracking signal transmitter 28 is present. For example, the tracking signal transmitter 28 may contain more than one-bit of data but less than the amount of data of the RFID signal transmitter 26.

While the tracking signal transmitter 28 has been described as being different by generally having less content storage for identification data (and thus, greater transmitting capabilities) than the RFID signal transmitter 26, it should be understood that the tracking signal may carry the same data content as the RFID response signal. In such embodiments, the tracking signal transmitter 28 thus acts as a redundant RFID signal transmitter 26 in the assembly 20 to improve the overall accuracy of the assembly. In these embodiments, however, the tracking signal transmitter 28 is different in its transmission strength. Thus, the tracking signal transmitter 28 has greater transmission strength than the RFID signal transmitter 26 (due to the greater power or battery associated with the tracking signal transmitter 28) to increase the likelihood of reader 30 reception.

The operation of the system will now be described with reference to FIG. 2, in which there is shown a functional block diagram of the container assembly for tracking a radio frequency identification tag 20 depicted in the exemplary embodiment of FIG. 1. In that regard, the container 22 is represented by block 1022; the RFID tag 24 (located on the container 22) is represented by block 1024; the RFID signal transmitter 26 is represented by block 1026; the tracking signal transmitter 28 is represented by block 1028; and the reader 30 is represented by block 1030. As will be discussed in detail below, arrows 1042, 1044, and 1046 in FIG. 2 represent the radio frequency signals sent from the reader 1030, the RFID signal transmitter 1026, and the tracking signal transmitter 1028, respectively. The area of transmission of the reader interrogation signal 1042 is the reader communication field 1050 marked by reader communication field boundary 1052.

The RFID signal transmitter 1026, in theory, is designed to receive the interrogation signal 1042 from the reader 1030 and, in response, to transmit RFID response signal 1044 as a response signal containing content and identification data at an appropriate transmission strength. However, these signal transmissions may not occur as theoretically predicted as a result of signal attenuation and interference from environmental noise. Similar to the RFID signal transmitter 1026, the tracking signal transmitter 1028 (which is generally associated with the RFID signal transmitter 1026) is designed to receive the interrogation signal 1042 from the reader 1030 and, in response, to transmit tracking signal 1046, for example, as a tracking signal at an appropriate transmission strength. Because the tracking signal transmitter 1028 is different at least in part from the RFID signal transmitter 1026, it is more apt to be received and read by the reader 1030. It should be appreciated that an appropriate retransmission strength will be dependent on the entire assembly 1020, in addition to the transmission strength of the reader 1030, and can vary according to the desired application.

It is further contemplated in the embodiments described herein, that different operating frequencies may be used for different communication purposes, for example, an RFID signal transmitter may have a first circuit for receiving power (in the case of a passive RFID signal transmitter), a second circuit for interrogation and transmission of an RFID signal carrying content and identification data, and a third circuit for transmission of a tracking signal. In addition, a different operating frequency may be used for transmitting interrogation signals from the reader to the RFID signal transmitters than is used for transmitting RFID response signals and/or tracking signals back from the RFID signal receivers and tracking signal receivers to the reader.

Upon receiving the tracking signals 1046, the data is counted and compared with the received RFID response signals 1044 to identify any system problems. In effect, if the reader 1030 counts a tracking signal 1046, but does not count an associated RFID response signal 1044, the comparison establishes the existence of a faulty RFID signal transmitter 1026 in need of repositioning, repair, or replacement or a failed RFID response signal 1044 transmission in need of retransmission or an extended period of transmission time such that it can be received by the reader 1030. No count by the reader 1030 of either a tracking signal 1046 or an RFID signal 1044 may establish the existence of both a faulty RFID signal transmitter 1026 and a faulty tracking signal transmitter 1028 (for example, an RFID tag 1024 that was submerged in water with both circuits shorted out) or, in some cases, an absent RFID tag 1024 or even an absent container 1022.

Once problems are identified within the system, automatic or manual adjustments can be made to resolve these problems. For example, interrogation signals 1042 can be resent from the reader 1030; RFID tags 1024 can be repositioned within the assembly 1020; RFID tags can be checked manually; or a system check can be performed to identify and/or correct any system deficiencies, faulty RFID signal transmitters 1026, missing RFID tags 1024, missing containers 1022, or other identified problems.

Although the tracking signal transmitter 1028 has been shown in the illustrated embodiment of FIG. 1 as a discrete transmitter circuit contained within the RFID tag 1024 carried by the container 1022, it should be appreciated that the RFID signal transmitter may be positioned elsewhere within the assembly to still be "associated with" the RFID signal transmitter 1026. For example, in the illustrated embodiment of FIG. 3, the tracking signal transmitter 228 is a discrete circuit contained within a second RFID tag 260, separate and distinct from the first RFID tag 224.

Now referring to FIGS. 3-6, container assemblies for tracking RFID tags constructed in accordance with other embodiments of the present disclosure will be described in greater detail. The assemblies are substantially identical in materials and operation as the previously described embodiment, except for differences regarding the RFID signal transmitter and the tracking signal transmitter, which will be described in detail below. In the illustrated embodiment of FIGS. 3 and 4, the RFID signal transmitter and the tracking signal transmitter are contained within discrete RFID tags. In the illustrated embodiment of FIGS. 5 and 6, the RFID signal transmitter and the tracking signal transmitter are contained within the same circuitry of one signal transmitter of one RFID tag.

Figure 3:
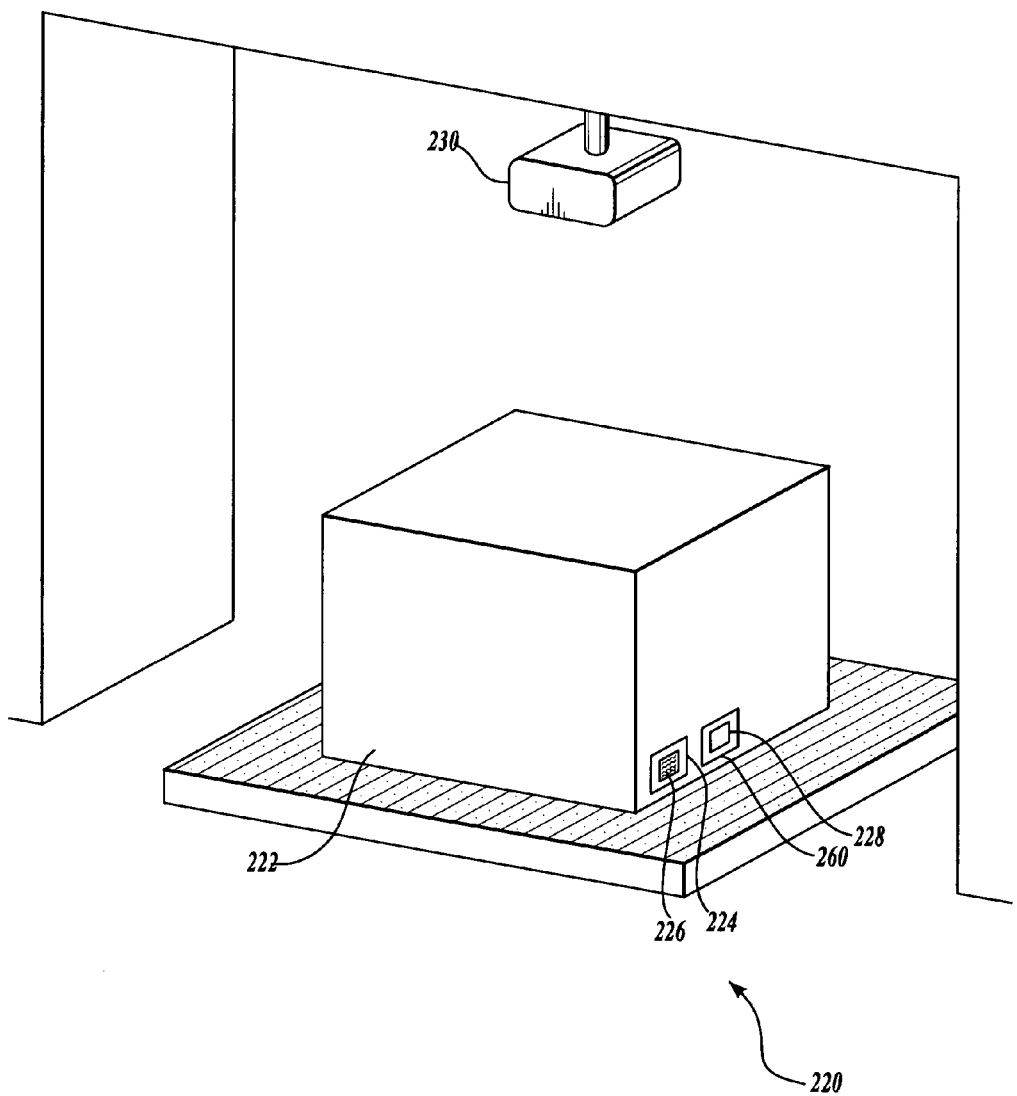
FIG. 3 is a perspective view of another exemplary embodiment of a container assembly formed according to various aspects of the present disclosure.
Figure 4:
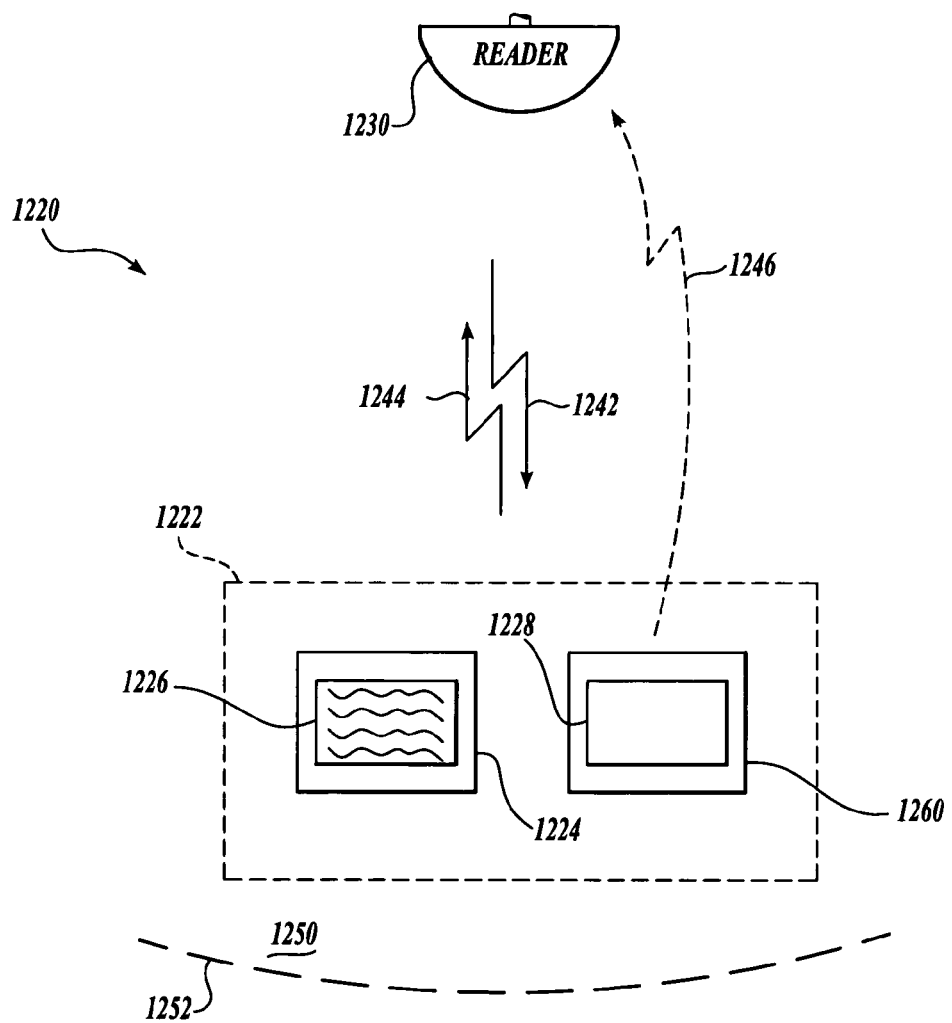
FIG. 4 is a functional block diagram of a container assembly according to the embodiment of FIG. 3.
Figure 5:
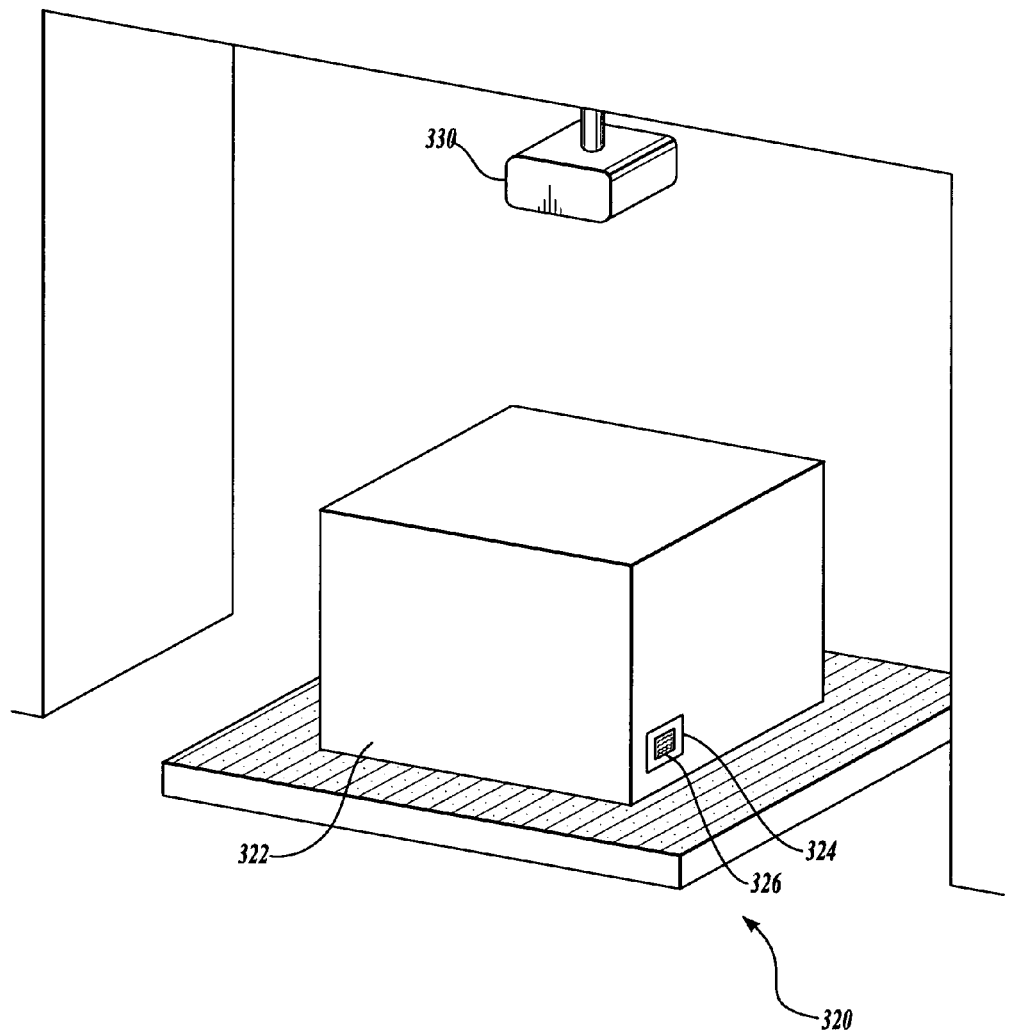
FIG. 5 is a perspective view of another exemplary embodiment of a container assembly formed according to various aspects of the present disclosure.
Figure 6:
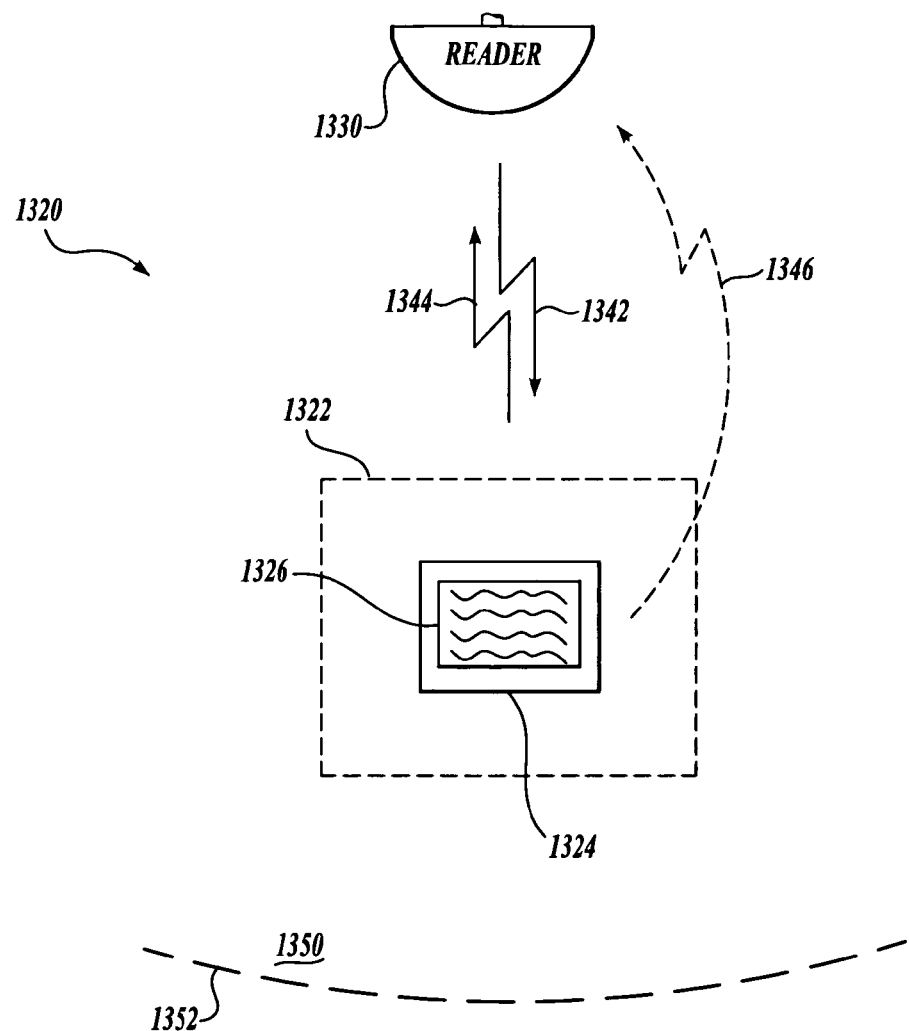
FIG. 6 is a functional block diagram of a container assembly according to the embodiment of FIG. 5.

For clarity in the ensuing descriptions, numeral references of like elements of the container assembly 20 are similar, but are in the 200 and/or 1200 series for the illustrated embodiment of FIGS. 3 and 4, and in the 300 and/or 1300 series for the illustrated embodiment of FIGS. 5 and 6.

Referring to FIG. 3, the RFID signal transmitter 226 operates in a manner similar to the embodiment of FIG. 2, except that the RFID signal transmitter 226 and the tracking signal transmitter 228 are not contained within the same RFID tag. In this regard, and with reference to FIG. 4, the operation of the system will now be described. The container 222 is represented by block 1222; the RFID tag 224 (located on the container 222) is represented by block 1224; the RFID signal transmitter 226 is represented by block 1226; the tracking tag 260 (also located on the container 222) is represented by block 1260; the tracking signal transmitter 228 is represented by block 1228; and the reader 230 is represented by block 1230. Arrows 1242, 1244, and 1246 represent the radio frequency signals sent from the reader 1230, the RFID signal transmitter 1226, and the tracking signal transmitter 1228, respectively. The area of transmission of the reader interrogation signal 1242 is the reader communication field 1250 marked by reader communication field boundary 1252.

In this embodiment, if the reader 1230 detects and/or counts a tracking signal 1246 but does not count an associated RFID response signal 1244, the comparison establishes the existence of a faulty RFID signal transmitter 1226 in need of repositioning, repair, or replacement; a failed RFID response signal 1244 transmission in need of retransmission or an extended period of transmission time such that it can be received by the reader 1230; or a missing or damaged RFID tag 1224. No count by the reader 1230 of either a tracking signal 1246 or an RFID response signal 1244 may establish damaged or absent RFID and tracking tags 1224 and 1260, or even an absent container 1222.

In yet other embodiments, the RFID signal transmitter is a multiple-signal transmitter. For example, in the illustrated embodiment of FIG. 5, a dual-signal transmitter 326 contained within RFID tag 324 is capable of receiving an interrogation signal and generating and transmitting two response signals: a first RFID response signal followed by a second tracking signal after a time delay. In this regard, and with reference to FIG. 6, the operation of the system will now be described. The container 322 is represented by block 1322; the RFID tag 324 (located on the container 322) is represented by block 1324; the signal transmitter 326 is represented by block 1326 and the reader 330 is represented by block 1330. The signal transmitter 326 is capable of transmitting both an RFID response signal 1344 and a tracking signal 1346 and therefore is both an RFID signal transmitter and a tracking signal transmitter. Arrows 1342, 1344, and 1346 represent the radio frequency signals sent from the reader 1330, the RFID signal transmitter, and the tracking signal transmitter, respectively. The area of transmission of the reader interrogation signal 1342 is the reader communication field 1350 marked by reader communication field boundary 1352.

If multiple signals are transmitted at the same frequency, such as in the illustrated embodiment of FIGS. 5 and 6, it should be understood that collision resolution and/or prevention methods, as known in the art, may be employed.

In this embodiment, if the reader 1330 detects and/or counts a tracking signal 1346 and an associated RFID response signal 1344, the comparison establishes the presence and functionality of an RFID signal transmitter 1326. However, if the reader 1330 detects and/or counts a tracking signal 1346 but does not detect and/or count an associated RFID response signal 1344, the comparison may establish a failed RFID response signal 1344 transmission in need of retransmission or an extended period of transmission time such that it can be received by the reader 1330. No count by the reader 1330 of either a tracking signal 1346 or an RFID response signal 1344 may establish a damaged, absent, or missing tag 1324, or even an absent container 1322.

Although the subject matter has been described in language specific to structural features and/or methodological acts, it is to be understood that the subject matter defined in the appended claims is not necessarily limited to specific features or acts described above. Instead, the specific features or acts described above are disclosed as example forms of implementing the claims.

The embodiments in which an exclusive property or privilege is claimed are defined as follows:

1. A container assembly in a system for tracking at least one radio frequency identification tag, comprising:
    (a) a container having a container body;
    (b) a first radio frequency signal transmitter of the at least one radio frequency identification tag associated with the container, wherein the first radio frequency signal transmitter is capable of transmitting a first radio frequency signal; and
    (c) a second radio frequency signal transmitter of the at least one radio frequency identification tag associated with the container, wherein the second radio frequency signal transmitter is capable of transmitting a second radio frequency signal different at least in part from the first radio frequency signal, wherein the first and second radio frequency signals transmit at different signal frequencies, wherein the first radio frequency signal carries identification data and the second radio frequency signal carries tracking data, and wherein the first and second radio frequency signals transmit at different signal strengths.

2. The container assembly of claim 1, wherein the tracking data is one-bit present/absent data.

3. The container assembly of claim 1, wherein the tracking data is counted and compared to the identification data.

4. The container assembly of claim 1, wherein the second radio frequency signal transmitter is integrated with the first radio frequency signal transmitter in a first radio frequency identification tag.

5. The container assembly of claim 1, wherein the first radio frequency signal transmitter is integrated in a first radio frequency identification tag and the second radio frequency signal transmitter is integrated in a second discrete radio frequency identification tag.

6. The container assembly of claim 1, wherein the first radio frequency signal and the second radio frequency signal are discrete signals.

7. The container assembly of claim 1, wherein the second radio frequency signal transmitter is capable of transmitting a second radio frequency signal different from the first radio frequency signal.

8. A method of tracking at least one radio frequency identification tag, comprising:
    (a) obtaining a container having a container body;
    (b) associating a first radio frequency signal transmitter of the at least one radio frequency identification tag with the container, wherein the first radio frequency signal transmitter is capable of transmitting a first radio frequency signal; and
    (c) associating a second radio frequency signal transmitter of the at least one radio frequency identification tag with the container, wherein the second radio frequency signal transmitter is capable of transmitting a second radio frequency signal different at least in part from the first radio frequency signal, wherein the first and second radio frequency signals transmit at different signal frequencies, wherein the first radio frequency signal carries identification data and the second radio frequency signal carries tracking data, and wherein the first and second radio frequency signals transmit at different signal strengths.

9. The method of claim 8, wherein the tracking data is one-bit present data.

10. The method of claim 8, further comprising counting the tracking data and comparing the tracking data with the identification data.

11. The container assembly of claim 8, wherein the first radio frequency signal and the second radio frequency signal are discrete signals.

12. The container assembly of claim 10, wherein the second radio frequency signal transmitter is capable of transmitting a second radio frequency signal different from the first radio frequency signal.

13. A container assembly in a system for tracking radio frequency identification tags, comprising:
    (a) a container having a container body;
    (b) a first radio frequency signal transmitter of the at least one radio frequency identification tag associated with the container, wherein the first radio frequency signal transmitter is capable of transmitting a first radio frequency signal and wherein the first radio frequency signal transmitter is integrated in a first radio frequency identification tag; and
    (c) a second radio frequency signal transmitter of the at least one radio frequency identification tag associated with the container, wherein the second radio frequency signal transmitter is capable of transmitting a second radio frequency signal different from the first radio frequency signal, wherein the first radio frequency signal and the second radio frequency signal are discrete signals that transmit at different frequencies, wherein the first radio frequency signal carries identification data and the second radio frequency signal carries tracking data, wherein the first and second radio frequency signals transmit at different signal strengths, and wherein the second radio frequency signal transmitter is integrated in a second radio frequency identification tag.

* * * * *